United States Patent
Rockwell et al.

(10) Patent No.: US 10,402,184 B2
(45) Date of Patent: Sep. 3, 2019

(54) MODULE INTERFACE FOR VEHICLE UPDATES

(71) Applicant: FORD GLOBAL TECHNOLOGIES, LLC, Dearborn, MI (US)

(72) Inventors: Mark Anthony Rockwell, Farmington Hills, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 834 days.

(21) Appl. No.: 14/282,015

(22) Filed: May 20, 2014

(65) Prior Publication Data

US 2015/0339114 A1 Nov. 26, 2015

(51) Int. Cl.
*G06F 8/65* (2018.01)
*G06F 21/57* (2013.01)

(52) U.S. Cl.
CPC ............. *G06F 8/65* (2013.01); *G06F 21/57* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 9,256,418 B2* | 2/2016 | Ran | G06F 8/65 |
| 2009/0300595 A1* | 12/2009 | Moran et al. | 717/170 |
| 2011/0113122 A1* | 5/2011 | Drope | 709/219 |
| 2011/0307336 A1* | 12/2011 | Smirnov et al. | 705/14.62 |
| 2011/0307882 A1* | 12/2011 | Shiba | 717/173 |
| 2011/0320089 A1 | 12/2011 | Lewis | |
| 2012/0030470 A1 | 2/2012 | Jdanov et al. | |
| 2012/0110563 A1* | 5/2012 | Ran | H04M 1/72525 717/170 |
| 2014/0068596 A1* | 3/2014 | Mota | 717/173 |
| 2014/0109075 A1* | 4/2014 | Hoffman et al. | 717/169 |

(Continued)

FOREIGN PATENT DOCUMENTS

CN 103095745 A 5/2013

OTHER PUBLICATIONS iRacing, Update Manager FAQ, retrieved from http://faq.iracing.com/article.php?id=178 on May 1, 2017.*

(Continued)

*Primary Examiner* — Thomas Ingram
(74) *Attorney, Agent, or Firm* — Frank L. Lollo; Brooks Kushman P.C.

(57) ABSTRACT

A vehicle may include a processor of a vehicle configured to communicate with an update server hosting software updates; and a software update management module connected to the processor and vehicle modules over a vehicle bus and configured to send an update command over the vehicle bus to invoke a software update mode for one of the vehicle modules identified by a software update, and apply the software update to the one of the vehicle modules. A computing system of a vehicle may be configured to request consent from a user to install a software update, when consent is received, install the software updates using a software update management module configured to invoke software update mode for a vehicle module identified by the software update, and apply the software update to the vehicle module, and when consent is not received, display an indication that software updates are available.

18 Claims, 8 Drawing Sheets

(56) References Cited

U.S. PATENT DOCUMENTS

| | | | |
|---|---|---|---|
| 2014/0297225 A1* | 10/2014 | Petroski et al. | 702/188 |
| 2014/0310702 A1* | 10/2014 | Ricci et al. | 717/173 |
| 2014/0325500 A1* | 10/2014 | Jang et al. | 717/173 |
| 2014/0380296 A1* | 12/2014 | Pal et al. | 717/171 |
| 2015/0007155 A1* | 1/2015 | Hoffman et al. | 717/168 |
| 2015/0100623 A1* | 4/2015 | Gudell | H04L 67/42 |
| | | | 709/203 |
| 2015/0169311 A1* | 6/2015 | Dickerson et al. | 717/170 |
| 2015/0191122 A1* | 7/2015 | Roy | G08G 1/0962 |
| | | | 340/439 |

OTHER PUBLICATIONS

Wayland, Michael, BlackBerry announces secure wireless software system updates for auto industry, MLivecom, printed Jan. 27, 2014, http://www.mlive.com/auto/index.ssf/2016/06/blackberry_bringing_secure_ove.html, 5 pages, Jun. 8, 2013.

Software Over-The-Air (SOTA) And Firmware Over-The-Air (FOTA) Technology, automotive software blog, May 23, 2013, http://www.movimentogroup.com/blog/?Tag=automotive%20software, May 23, 2013, 3 pages.

Howard, Bill, Mercedes-Benz to offer over-the-air car updates, Extreme Tech, Printed from http://www.extremetech.com/extreme/125621-mercedes-benz-over-the-air-car-updates, Apr. 10, 2012.

\* cited by examiner

US 10,402,184 B2

MODULE INTERFACE FOR VEHICLE UPDATES

TECHNICAL FIELD

This disclosure generally relates to a module interface for facilitating software updates to modules of a receiving vehicle.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

SUMMARY

In a first illustrative embodiment, a system includes a processor of a vehicle configured to communicate with an update server hosting software updates; and a software update management module connected to the processor and vehicle modules over a vehicle bus and configured to send an update command over the vehicle bus to invoke a software update mode for one of the vehicle modules identified by a software update, and apply the software update to the one of the vehicle modules.

In a second illustrative embodiment, a system includes a computing system of a vehicle configured to request consent from a user to install a software update, when consent is received, install the software updates using a software update management module configured to invoke software update mode for a vehicle module identified by the software update, and apply the software update to the vehicle module, and when consent is not received, display an indication that software updates are available.

In a third illustrative embodiment, a computer-implemented method includes installing a software update by a computing system of a vehicle by invoking a software update mode for a vehicle module identified by the software update and applying the software update to the vehicle module if user consent has been received; and displaying an indication that software updates are available otherwise.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may incorporate a software update management module to facilitate software updates for the vehicle. The software update management module may be configured to communicate with an update server via a vehicle computing system. Using the update server, the software update management module may be configured to receive software updates to be applied to various modules of the vehicle. The software update management module may be further configured to access an in-vehicle network to provide the software updates to the vehicle modules to be updated. In an example, the in-vehicle network may be a vehicle controller area network (CAN). The software update management module may be further configured to support various functions useful for the updating of software of the vehicle modules. For example, the software update management module may be configured to perform diagnostic functions by reading diagnostic codes via the vehicle network.

The vehicle may be further configured to provide a vehicle human-machine interface (HMI) through which a user may select software update to be applied to the vehicle modules using the software update management module. In addition to software updates designed to provide for quality improvement, the software update management module may be further utilized to offer optional applications for download. As an example, the system may offer an owner of a sports car an application download of a performance version of vehicle engine settings or transmission shift points. As another example, the system may offer an owner of a heavy-duty truck a towing enhancement package including additional features to allow a user to better manage a vehicle trailer. Upon user selection, the software updates and new applications may be installed to the vehicle modules by the software update management module.

Figure 1:
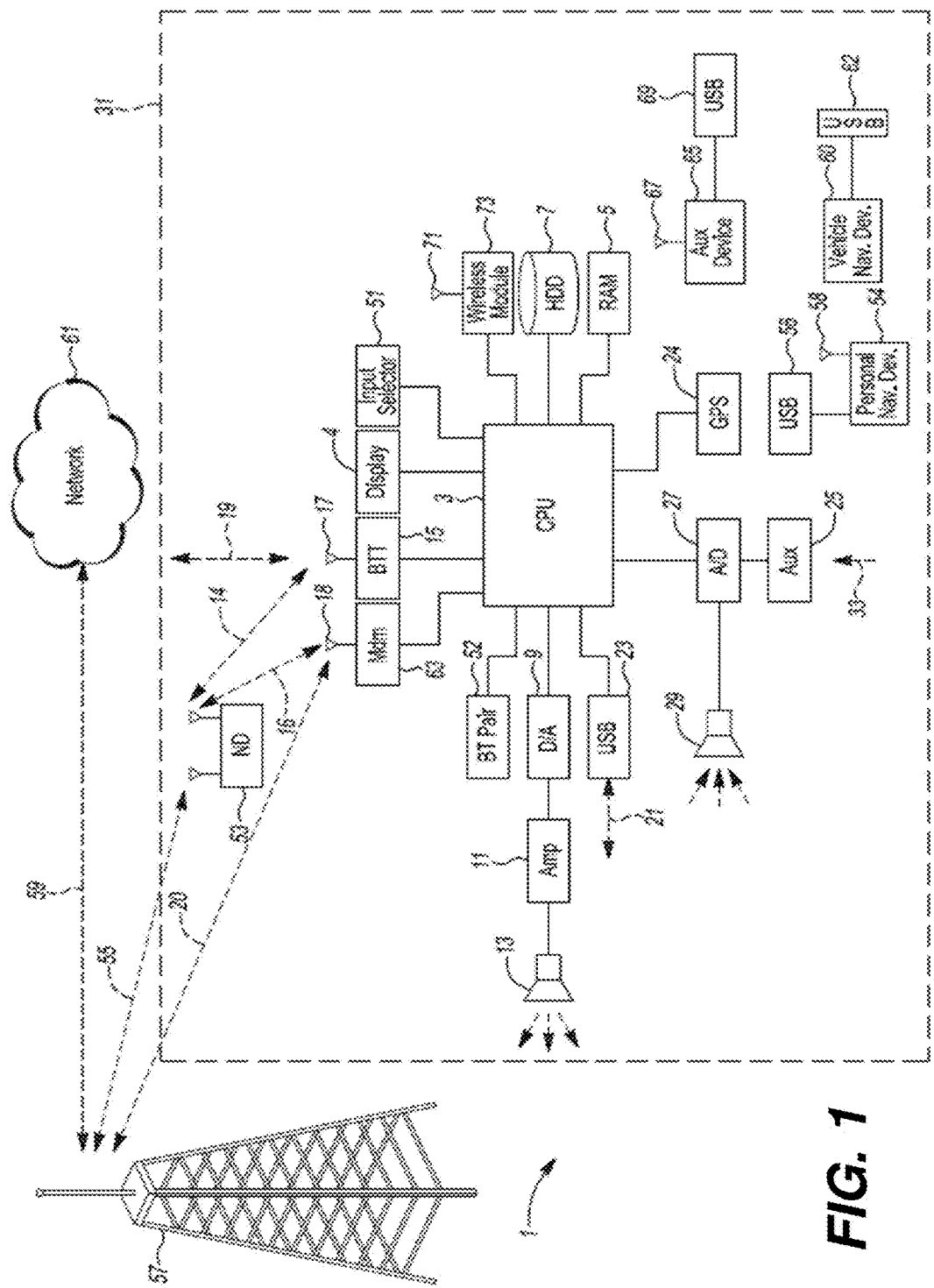
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards.

Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
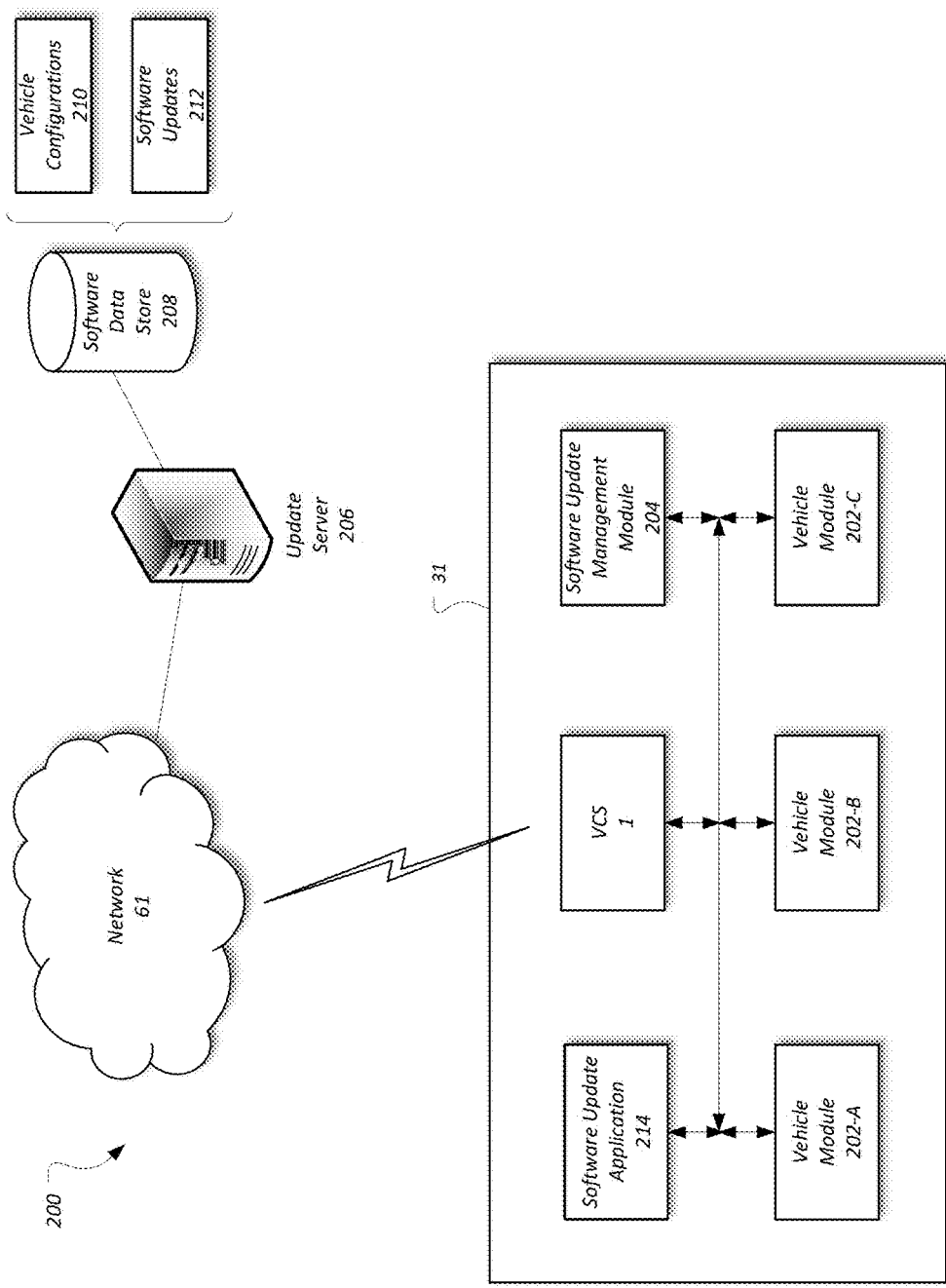
FIG. 2 illustrates an exemplary vehicle system including a software update management module in communication with a remote software server.

FIG. 2 illustrates an exemplary vehicle 31 system 200 for providing customized updates to the vehicle 31. The system 200 includes including the VCS 1 in communication over the network 61 with an update server 206. The update server 206 may communicate with a software data store 208 storing vehicle configurations 210 and software updates 212. The system 200 further includes a software update management module 204 in communication with the VCS 1 and various modules 202-A through 202-C (collectively 202) of the vehicle 31 and configured to install software updates 212. The VCS 1 may further include a software update application 214 configured to allow the user to control the application of software updates 212 performed by way of the software update management module 204. While an exemplary system 200 is shown in FIG. 2, the exemplary components illustrated in the Figure are not intended to be limiting. Indeed, the system 200 may have more or fewer components, and additional or alternative components and/or implementations may be used. As an example, while three vehicle modules 202 are illustrated, systems 200 may include more or fewer modules 202. As another example, while the software update management module 204 is illustrated as a separate component, in other examples it may be combined with other components, e.g., integrated with the VCS 1 as one possibility.

The vehicle modules 202 may include various vehicle 31 components configured to receive updates of associated software, firmware, or configuration settings. For instance, the vehicle modules 202 may be configured to implement an update interface of vehicle bus commands including a command invoke a software update mode for the vehicle module 202, a command to receive updated configuration or software data to be applied to the vehicle module 202, and a command to reset the vehicle module 202 and reload the configuration and software data. As some non-limiting examples, the vehicle modules 202 may include a powertrain control module (PCM), a brake system control module (BSCM), and body control module (BCM).

The software update management module 204 may be configured to access an in-vehicle network to communicate with the vehicle modules 202. In an example, the in-vehicle network may be a vehicle controller area network (CAN). When a vehicle 31 is assembled, the vehicle 31 may include various hardware and software components. Upon or after assembly, the software update management module 204 may be configured to query for existence and version information for at least a portion of these hardware and software components of the vehicle modules 202 of the vehicle 31.

The software update management module 204 may be further configured to access the VCS 1 to communicate with the update server 206 over the network 61. Using the queried information and additional information identifying the specific vehicle 31 (e.g., VIN information published on the CAN bus, subscriber identity module (SIM) information of the modem 63 such as international mobile station equipment identity (IMEI), etc.), the software update management module 204 may communicate via the network 61 to establish an account with the update server 206. The update server 206 may receive these communications from the vehicles 31, and may maintain a software data store 208 of vehicle configuration 210 information related to the received hardware configurations and software (e.g., firmware, etc.) versions linked to identifiers of the vehicles 31.

The software data store 208 may be further configured to store software updates 212 that may be provided to the vehicle 31. The software updates 212 may include, for example, updated configuration settings for one or more vehicle 31 modules, and/or updated versions of software or firmware to be installed on one or more vehicle 31 modules. The software updates 212 may also include, for example, additional applications that may be available for download to the vehicle 31.

The software data store 208 may be further configured to store additional information about the software updates 212. For example, the software data store 208 may be configured to maintain an optional/required flag regarding the software updates 212 allow the vehicles 31 to determine which software updates 212 are necessary and which are optional (e.g., an optional flag). As another example, the software data store 208 may be configured to maintain indications of which vehicle module(s) 202 are associated with which software updates 212. The software data store 208 may further store information indicative of the compatibility of the software updates 212 to vehicle model or configuration. For instance, a storage entry for a software update 212 may indicate that the software update 212 is compatible with a certain make and model of vehicle 31, or that it has a dependency on a version of another vehicle module 202 being of a particular version or versions.

The software update application 214 may be configured to receive an indication to initiate providing of software updates 212. As one possibility, the software update application 214 of the VCS 1 may receive a command request from a user requesting to check for software updates 212. As another possibility, the software update management module 204 may trigger a periodic check for new software updates 212, and may provide an indication of the triggered request to the software update application 214. Upon request by the user or by the software update management module, the software update application 214 may be configured to send a request to the update server 206 to inquire whether software updates 212 for the vehicle 31 are available. For example, the software update application 214 may query the update server 206 using an identifier of the vehicle 31 (e.g., vehicle 31 VIN, vehicle 31 SIM information, etc.) and may receive a response from the update server 206 indicative of whether new software updates 212 for the vehicle 31 are available (e.g., as links or other identifiers of software updates 212 for the vehicle 31 to download).

The software update application 214 may be further configured to provide a user interface for the software update management module 204 to the user via the VCS 1. For example, the software update application 214 may be configured to provide a prompt to the user (e.g., via the display 4 or speaker 13 of the VCS 1) informing the user that software updates 212 are available and requesting permission to proceed with installation of the software updates 212. As another possibility, the software update application 214 may be configured to provide an indication of available updates within the gauge cluster of the vehicle 31 when software updates 212 are available (e.g., downloaded).

Once the user confirms that the software updates 212 should be installed, the software update management module 204 may be configured to support various functions useful in support of the updating of the software of the vehicle modules 202. For example, the software update management module 204 may be configured to invoke a software update mode, for the vehicle modules 202 identified by the software updates 212 as recipients of the software updates 212, by providing a message from the software update management module 204 to the recipient vehicle modules 202 over the vehicle bus. The software update management module 204 may be further configured to transfer the software updates 212 to the vehicle module vehicle modules 202 via the vehicle bus to perform the flash updating reprogramming, and perform a force reset of the recipient vehicle modules 202 upon completion of the software update 212 to cause the vehicle modules 202 to reload and utilize the updated software. The software update management module 204 may also be configured to perform diagnostic functions regarding success of the update procedure by reading diagnostic codes via the vehicle bus. Further aspects of the operation of the software update management module 204 and software update application 214 are discussed with respect to the FIGS. 3-7 below.

Figure 3:
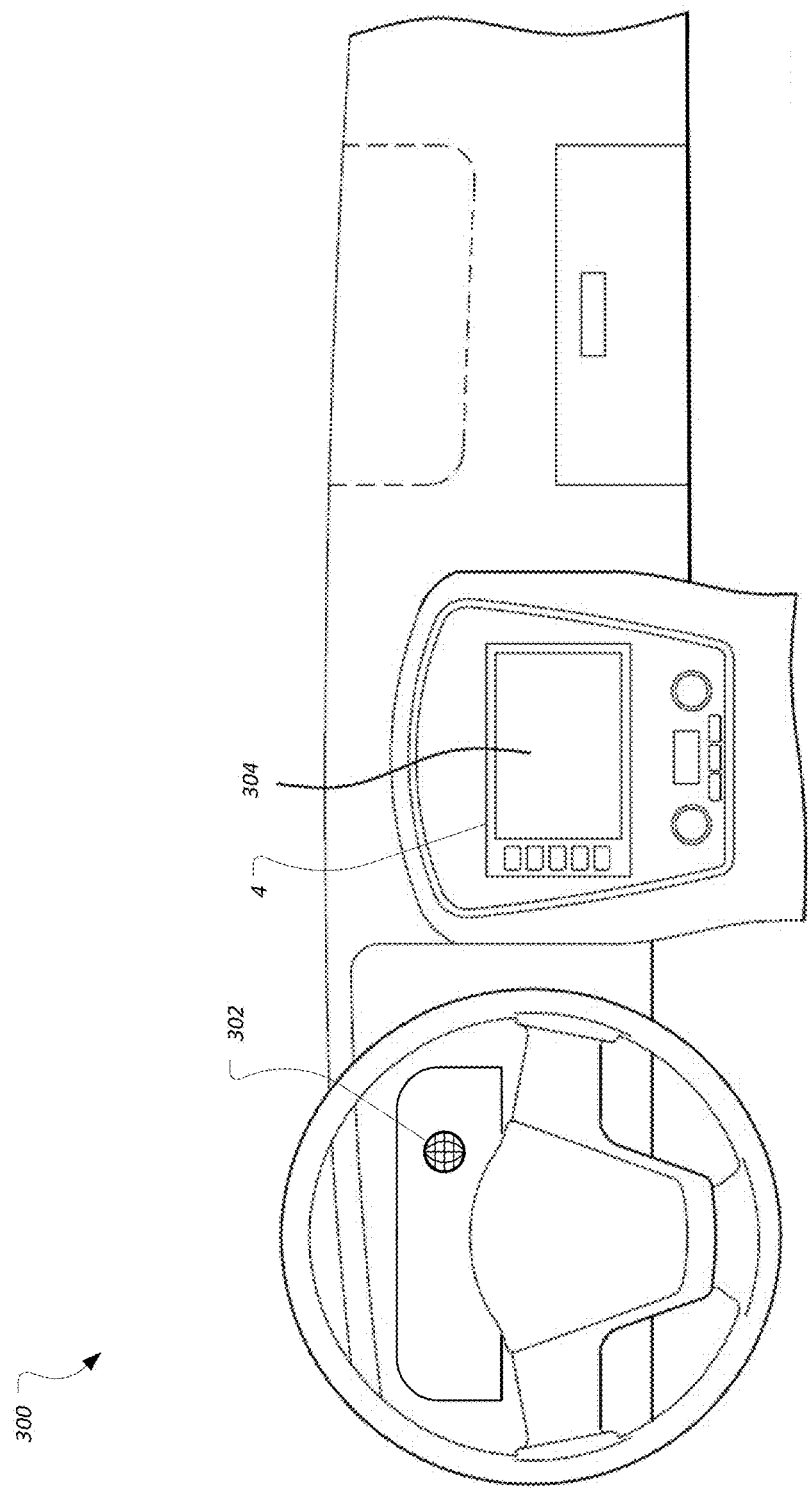
FIG. 3 illustrates an exemplary portion of the vehicle including a notification of pending software updates.

FIG. 3 illustrates an exemplary portion 300 of the vehicle 31 including a notification 302 of pending software updates 212. The software updates application 214 may be configured to cause the VCS 1 to provide the notification 302 to indicate to the user that software updates 212 are available for the vehicle 31 that have not yet been installed. As illustrated, the notification 302 may be included as an icon within a gauge cluster of the vehicle 31. Additionally or alternatively, the notification 302 may be displayed on the display 4 of the VCS 1 within a user interface 304 of the VCS 1. The user interface 304 of the VCS 1 may be further utilized by the software updates application 214 to facilitate the process of applying software updates 212 to the vehicle modules 202 via the software update management module 204.

Figure 4:
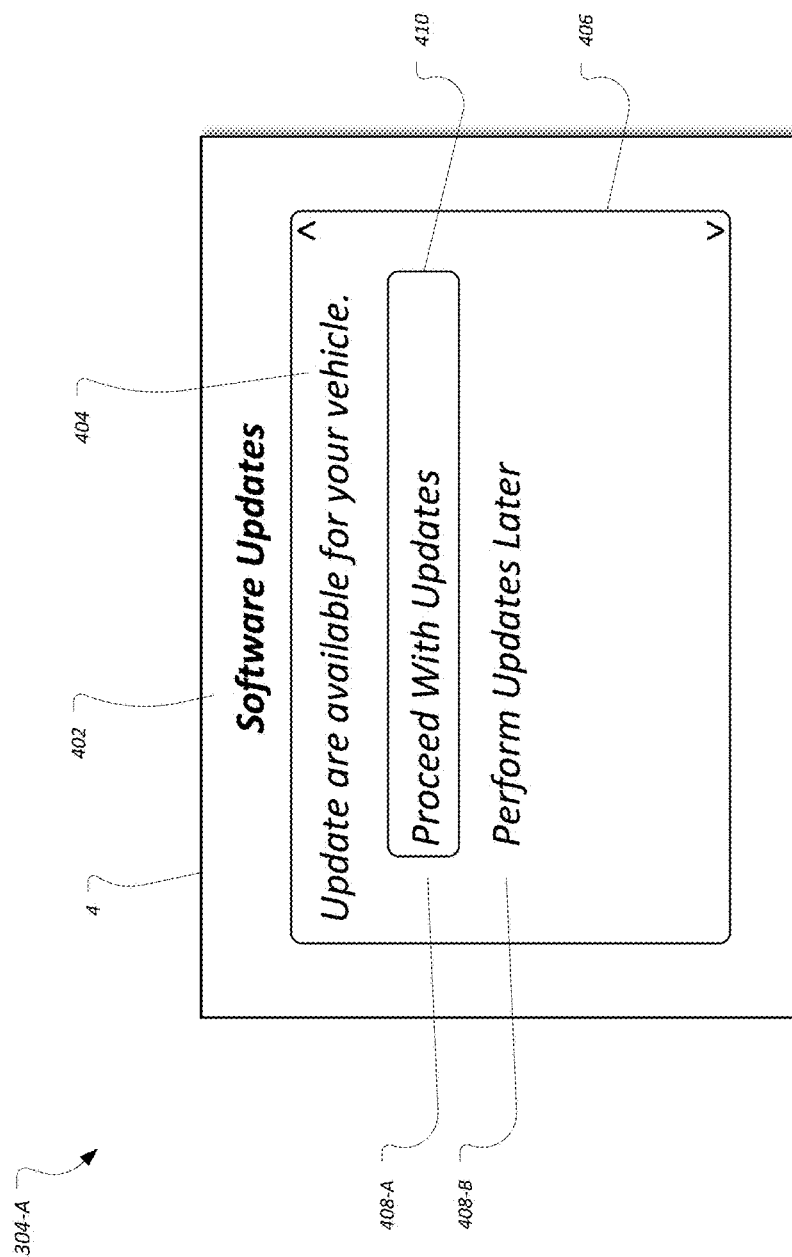
FIG. 4 illustrates an exemplary user interface of the software update application indicating that updates are available for the vehicle.

FIG. 4 illustrates an exemplary user interface 304-A of the software update application 214 indicating that updates are available for the vehicle 31. The user interface 304-A may be presented by the software update application 214 in the vehicle 31 via the display 4, and may include a title label 402 to indicate to the user that the user interface 304-A is for the software update application 214. The user interface 304-A may further include a description label 404 to indicate to the user that available software updates 212 may be installed if the user consents to their installation. The user interface 304-A may further include a list control 406 configured to display a selectable list of entries 408 (e.g., as illustrated including a "proceed with updates" entry 408-A and a "perform updates later" entry 408-B). The list control 406 may operate as a menu, such that a user of the user interface 304-A may be able to scroll through the list entries 408 to choose whether or not to install the available software updates 212 (e.g., using voice commands or up and down arrow buttons of the VCS 1 and a select button of the VCS 1 to invoke the selected menu item 410).

Figure 5:
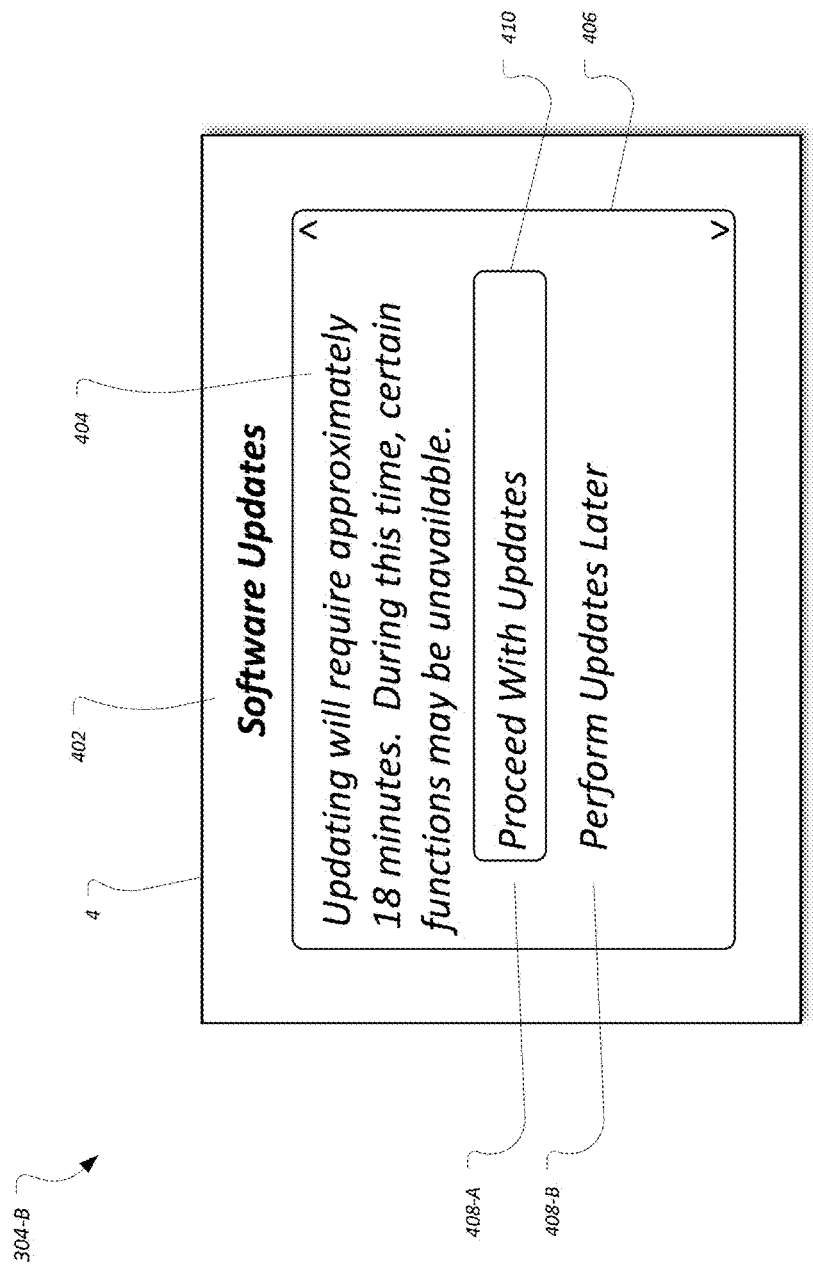
FIG. 5 illustrates an exemplary user interface of the software update application requesting confirmation that the updating should proceed.

FIG. 5 illustrates an exemplary user interface 304-B of the software update application 214 requesting confirmation that the updating should proceed. As with the user interface 304-A, the user interface 304-B may also be presented by the software update application 214 in the vehicle 31 via the display 4, and may include a title label 402 to indicate to the user that the user interface 304-B is for the software update application 214.

The user interface 304-B may further include a description label 404 to indicate to the user how much time may be required to perform the installation of the available software updates 212, as well as that certain features of the vehicle 31 may be unavailable during the installation process. For instance, in some cases the VCS 1 may be unable to switch to other VCS 1 applications, such as navigation, when software updates 212 are being installed. In other cases, if the vehicle modules 202 to be updated are important to the functioning of the vehicle 31 (e.g., the BCM, PCM, BSCM, etc.), the VCS 1 may be configured to inform the user that the vehicle 31 may not be placed into motive mode when those modules 202 are being updated. The user interface 304-B may further include a list control 406 configured to display a selectable list of entries 408 (e.g., as illustrated again including the "proceed with updates" entry 408-A and the "perform updates later" entry 408-B), but in this case to request confirmation that the amount of time for updates is acceptable for the user.

Figure 6:
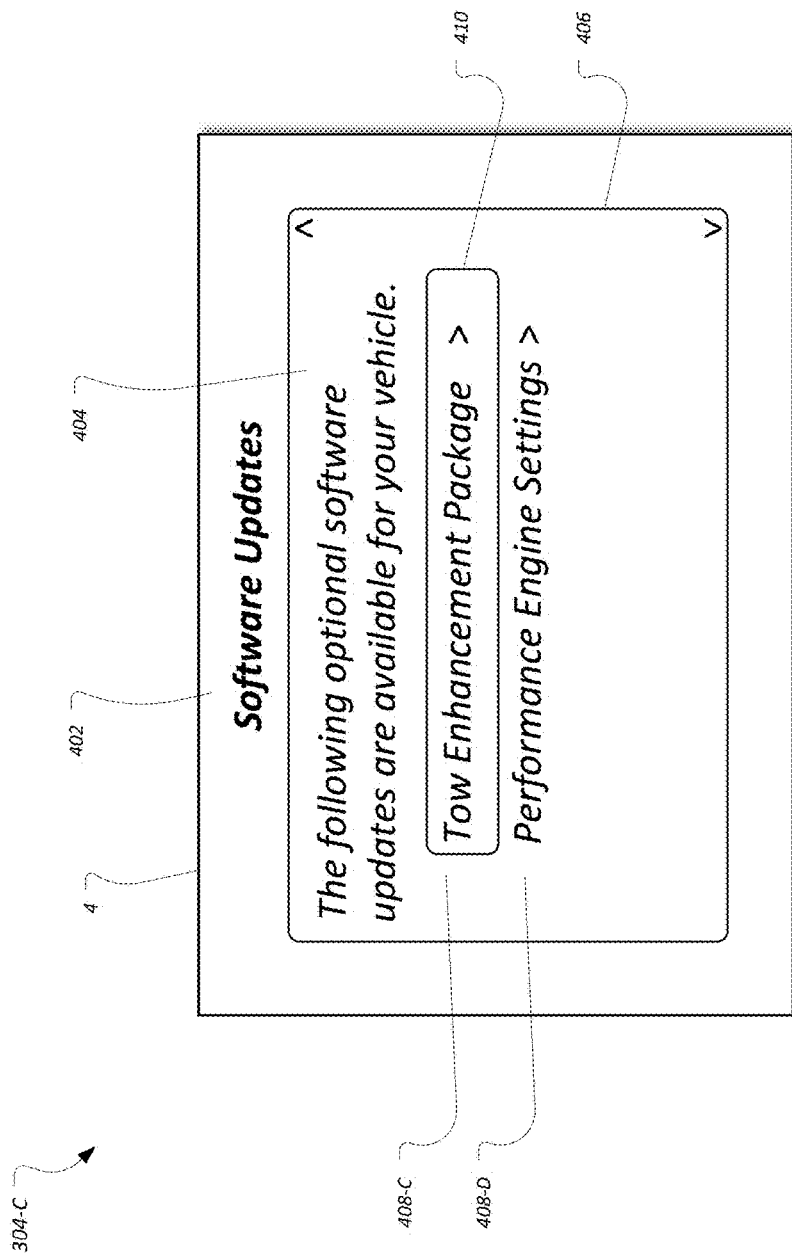
FIG. 6 illustrates an exemplary user interface of the software update application indicating optional software updates that are available.

FIG. 6 illustrates an exemplary user interface 304-C of the software update application 214 indicating optional software updates 212 that are available. The software updates 212 may be identified as optional, for example, according to the optional flag or other indicator associated with the software updates 212. As with the user interfaces 304-A and 304-B, the user interface 304-C may be presented by the software update application 214 in the vehicle 31 via the display 4, and may include a title label 402 to indicate to the user that the user interface 304-C is for the software update application 214

The user interface 304-C may further include a description label 404 to indicate to the user that the listed software updates 212 are optional software components that may be installed to the vehicle 31. The user interface 304-C may further include a list control 406 configured to display a selectable list of entries 408, where each entry 408 corresponds to an available optional software update 212. For instance, the list control 406 may include an entry 408-C corresponding to an optional tow enhancement package software update 212 configured to provide additional software tow features to the vehicle 31. As another example, the list control 406 may include an entry 408-D corresponding to an optional performance engine settings package software update 212 configured to provide a more aggressive engine tuning to the vehicle 31. A user may select an optional software update 212 to be installed (e.g., using voice commands or up, down and select buttons of the VCS 1). When an optional software update 212 is chosen by the user, the software update application 214 may be configured to display a user interface 304 such as the user interface 304-B to allow the user to confirm selection of the optional installation.

Figure 7:
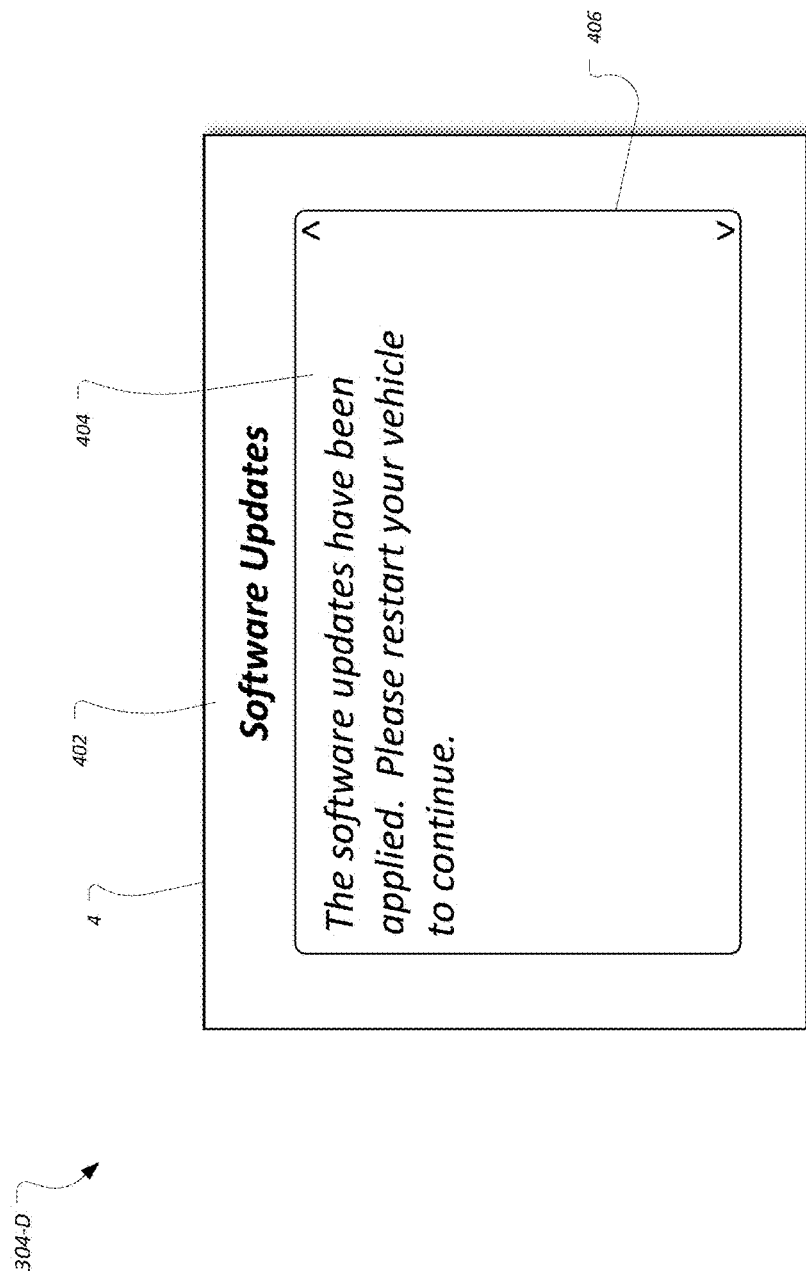
FIG. 7 illustrates an exemplary user interface of the software update application indicating completion of installation of the software updates.

FIG. 7 illustrates an exemplary user interface 304-D of the software update application 214 indicating completion of installation of the software updates 212. As with the user interfaces 304-A through 304-C, the user interface 304-D may be presented by the software update application 214 in the vehicle 31 via the display 4, and may include a title label 402 to indicate to the user that the user interface 304-D is for the software update application 214.

The user interface 304-D may further include a description label 404 to indicate to the user that the software updates 212 have been installed. The description label 404 may further include additional information, such as an indication that the user should restart (e.g., key cycle) the vehicle 31 to complete the installation of the software updates 212 and exit software update mode.

Figure 8:
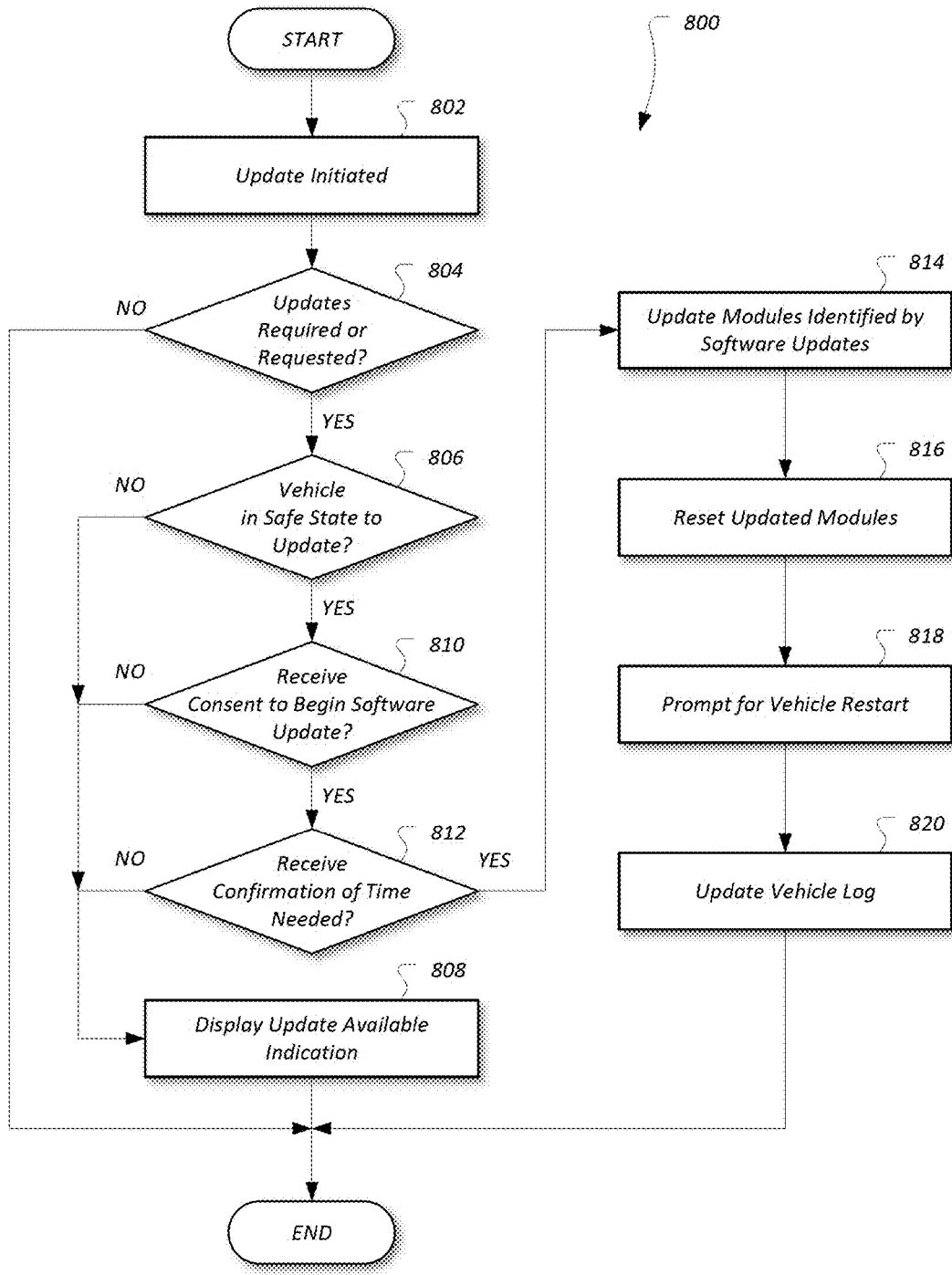
FIG. 8 illustrates an exemplary process of using a software update management module to apply software updates to the vehicle modules of the vehicle.

FIG. 8 illustrates an exemplary process 800 of using the software update management module 204 to apply software updates 212 to the vehicle modules 202 of the vehicle 31. The process 800 may be performed, for example, by the VCS 1 in communication with the software update management module 204 and the update server 206.

At operation 802, the software update application 214 receives an indication to initiate software update 212 mode. As one possibility, the software update application 214 of the VCS 1 may receive a command request from a user requesting to check for software updates 212. As another possibility, the software update management module 204 may trigger a periodic check for new software updates 212, and may provide an indication of the triggered request to the software update application 214.

At operation 804, the software update application 214 determines whether software updates 212 are available for installation. As an example, the software update application 214 may query the update server 206 using an identifier of the vehicle 31 (e.g., vehicle 31 VIN, vehicle 31 SIM information, etc.) and may receive a response from the update server 206 indicative of whether new or otherwise uninstalled software updates 212 for the vehicle 31 are available. If updates are available, control passes to operation 806. If not, the process 800 ends.

At operation 806, the software update application 214 determines whether the vehicle 31 is in a safe state to apply the software updates 212. For example, the software update application 214 may verify that the vehicle 31 is parked or in an accessory or other vehicle 31 mode in which the vehicle 31 may be able to make updates to the vehicle modules 202 when they are not in operation. The software update application 214 may determine whether the vehicle 31 may be required to be stopped when performing the vehicle 31 updates based on the indications of the vehicle modules 202 associated with the software updates 212 (e.g., updates to the BCM, PCM, or BSCM, would require the vehicle 31 to be stationary, but installation of a color scheme to the VCS 1 or updated navigation information may not). If the software update application 214 determines that updates may not be performed at the current time, control passes to operation 808. Otherwise control passes to operation 810.

At operation 808, the software update application 214 displays an update available indication to inform the user that software updates 212 are waiting. For example, as illustrated in FIG. 3, the software updates application 214 may be configured to cause the VCS 1 to provide the notification 302 as an icon within the gauge cluster of the vehicle 31. Additionally or alternatively, the software updates application 214 may be configured to cause the VCS 1 to provide the notification 302 on the display 4 of the VCS 1 within a user interface 304 of the VCS 1. The software update application 214 may be configured to provide the notification 302 to the user until the user chooses to return to the software update application 214 and complete installation of the software updates 212. In cases where software update 212 mode was requested by the user, the vehicle 31 may be further configured to provide an indication to the user that updating cannot be performed at the current time because, e.g., the vehicle 31 is in a motive mode. After operation 808, the process 800 ends.

At operation 810, the software update application 214 requests user consent to initiate installation of the software updates 212. For example, the software update application 214 may present a user interface 304 to the user, such as the user interface 304-A illustrated in FIG. 4, indicating that updates are available and asking whether updating should proceed. If the user requests via the user interface 304 to proceed with updates, control passes to operation 812. Otherwise, control passes to operation 808.

At operation 812, the software update application 214 requests confirmation of the time required to install the software updates 212. For example, the software update application 214 may present a user interface 304, such as the user interface 304-B illustrated in FIG. 5, indicating the estimated timing required to complete the update process and asking whether updating should proceed. If the user agrees via the user interface 304 to proceed with the software updates 212, control passes to operation 814. Otherwise, control passes to operation 808.

At operation 814, the software update application 214 updates the vehicle modules 202 identified by the received software updates 212. For example, the software update application 214 may request for the software update management module 204 to perform flash updating reprogramming procedures of the vehicle modules 202 indicated by the module identifiers of the software updates 212, using the updated software and/or configuration settings included in the software updates 212.

At operation 816, the software update management module 204 resets the vehicle modules 202 identified by the software updates 212. For example, after applying the updated software and/or configuration settings included in the software updates 212, the software update management module 204 may send commands to the updated vehicle modules 202 configured to cause the receiving vehicle modules 202 to perform forced reset sequences. These forced reset sequences may be requested to cause the vehicle modules 202 being updated to discard previously cached software and/or settings and reinitialize using the updated software and/or settings.

At operation 818, the software update application 214 provides a prompt for the user to restart the vehicle 31. For example, upon receiving an indication of completion of the update process from the software update management module 204, the software update application 214 may be configured to present a user interface 304, such as the user interface 304-D illustrated in FIG. 7, providing an indication in the user interface indicating that the user may be required to key-cycle the vehicle 31 to complete application of the software updates 212.

At operation 820, the software update application 214 updates the vehicle log. For example, the software update application 214 may be configured to include indications in the vehicle log of which software updates 212 were installed to the vehicle 31 and when. The vehicle log may include other information regarding the vehicle 31, such as when oil changes or other vehicle 31 maintenance operations were performed. In some cases, the vehicle log information may be provided to a network server to allow users to view the update log remote from the vehicle. After operation 820, the process 800 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor of a vehicle configured to communicate with an update server hosting software updates; and
a software update management module connected to the processor and vehicle modules over a vehicle bus and configured to
determine that a software update is an optional software update based on a data indicator associated with the software update, wherein the software update is configured to at least one of add an additional feature to a vehicle module or adjust a configuration of an existing feature of a vehicle module,
provide, in a head unit display of the vehicle, an indication of an optional status of the software update and a request for consent from a user to install the optional software update,
invoke a software update mode responsive to receipt of a message indicating user consent to install the software update,
send an update command over the vehicle bus to invoke the software update mode for the vehicle module identified by the software update,
apply the software update to the vehicle module by installing the update to a memory of the vehicle module, and
display an indication as an icon within a gauge cluster of the vehicle responsive to lack of receipt of the user consent.

2. The system of claim 1, wherein the software update management module is further configured to send a reset command over the vehicle bus to perform a force reset of the vehicle module upon completion of the software update.

3. The system of claim 1, wherein the software update management module is further configured to periodically request the processor to request software updates from the update server, and wherein the software update is downloaded by the processor from the update server responsive to a periodic request for updates from the update server.

4. The system of claim 1, wherein the software update management module is further configured to update a vehicle history log to indicate a result of application of the software update to the vehicle module.

5. The system of claim 1, wherein the user consent to install the software update includes receipt of a first consent to install software updates, and receipt of a second consent to wait an estimated amount of time for the software update to be installed.

6. The system of claim 1, wherein the processor is further configured to prompt to key cycle the vehicle responsive to receipt of an indication of completion of the software update from the software update management module.

7. A system comprising:
a gauge cluster of a vehicle, and
a computing system of the vehicle programmed to
request consent to install a software update indicated as being an optional software update to add an additional feature to the vehicle or adjust a configuration of an existing feature of the vehicle, and
when consent is not received, display an indication in the gauge cluster that the optional software update is available.

8. The system of claim 7, wherein the computing system is further programmed to:
determine that the software update is an optional software update configured to at least one of add an additional feature to a vehicle module or adjust a configuration of an existing feature of a vehicle module, and
provide, in a user interface of the vehicle, an indication of an optional status of the software update and a request for consent from the user to install the software update as an optional software update.

9. The system of claim 7, wherein the computing system is further programmed to:
determine that installation of the software update is complete, and
provide, in a user interface of the vehicle, an indication that the software update will be available upon vehicle restart.

10. The system of claim 7, wherein the computing system is further programmed to update a vehicle history log to indicate a result of application of the software update to the vehicle.

11. The system of claim 7, wherein the computing system is further programmed to invoke a software update mode responsive to user consent to install the software update.

12. The system of claim 11, wherein user consent to install the software update includes receipt of a first consent to install software updates, and receipt of a second consent to wait an estimated amount of time for the software update to be installed.

13. The system of claim 7, wherein the computing system is further programmed to prompt to restart the vehicle upon completion of install of the software update.

14. A method comprising:
displaying, as an icon in a gauge cluster of a vehicle, an indication that an optional software update configured to at least one of add an additional feature to a vehicle or adjust a configuration of an existing feature of the vehicle is available for installation; and
installing the software update by a computing system of the vehicle responsive to receipt of user consent to install the software update.

15. The method of claim 14, further comprising:
providing, in a user interface of the vehicle, the indication of an optional status of the software update and a request for consent from the user to install the software update as an optional software update.

16. The method of claim 14, further comprising:
determining that installation of the software update is complete, and providing, in a user interface of the vehicle, an indication that the software update will be available upon vehicle restart.

17. The method of claim 14, further comprising displaying the icon within a gauge cluster of the vehicle.

18. The method of claim 14, further comprising, upon completion of install of the software update, at least one of updating a vehicle history log to indicate a result of application of the software update to the vehicle or prompting to restart the vehicle.

* * * * *